(12) United States Patent
Schempp et al.

(10) Patent No.: US 7,665,907 B2
(45) Date of Patent: Feb. 23, 2010

(54) OPTICAL CONNECTOR ASSEMBLY

(75) Inventors: Otto Schempp, Rappenau (DE);
Mathias Gerner, Obertshausen (DE)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 11/885,132

(22) PCT Filed: Feb. 28, 2006

(86) PCT No.: PCT/EP2006/001832
§ 371 (c)(1),
(2), (4) Date: Aug. 4, 2008

(87) PCT Pub. No.: WO2006/089800
PCT Pub. Date: Aug. 31, 2006

(65) Prior Publication Data
US 2009/0034913 A1 Feb. 5, 2009

(30) Foreign Application Priority Data
Feb. 28, 2005 (DE) .................. 10 2005 009 576

(51) Int. Cl.
G02B 6/36 (2006.01)
(52) U.S. Cl. .................. 385/92; 385/88; 385/89; 385/90
(58) Field of Classification Search .............. 385/88–94
See application file for complete search history.

(56) References Cited
U.S. PATENT DOCUMENTS
4,118,100 A 10/1978 Goell et al.

(Continued)

FOREIGN PATENT DOCUMENTS
DE 2907401 8/1985

(Continued)

OTHER PUBLICATIONS
International Search Report and Written Opinion for PCT Patent Application No. PCT/EP2006/001832. Jun. 2, 2006.

(Continued)

*Primary Examiner*—Ellen Kim
(74) *Attorney, Agent, or Firm*—Timothy M. Morella

(57) ABSTRACT

The invention relates to an optical connector assembly for connecting optical waveguides to electro-optical components, in particular for producing multimedia connections in motor vehicles, for example in accordance with the MOST® standard. The connector assembly comprises a connector (12) having a mating connector receptacle (16) for receiving a complementary mating connector (112), the mating connector (112) for forming the mating connection with the connector (12), the optical waveguide (128), which is held at a contact end (138) by means of the mating connector (112) in order to establish an optical connection between the optical waveguide (128) and the electro-optical component (58) when the mating connection is formed between the connector (12) and the mating connector (112), and the electro-optical component (58), which is arranged on a rear side (22) of the connector (12) and has an optically active area (428) having a predetermined diameter for coupling optical signals in/out, the connector (12) having a connection element (68) for receiving the optical waveguide (128), an optical coupling element (28) being arranged in the connector (12) between the optical waveguide (128) and the electro-optical component (58) for transmitting light waves from the optical waveguide (128) to the electro-optical component (58), or vice versa, and the coupling element (28) comprising an essentially cylindrical optical waveguide section (318), which has a larger diameter than the optical waveguide (128).

22 Claims, 5 Drawing Sheets

U.S. PATENT DOCUMENTS

| | | | |
|---|---|---|---|
| 4,186,996 A * | 2/1980 | Bowen et al. | 385/92 |
| 4,222,629 A | 9/1980 | Dassele et al. | |
| 4,268,114 A | 5/1981 | D'Auria et al. | |
| 4,302,070 A | 11/1981 | Nakayama et al. | |
| 4,386,268 A | 5/1983 | Kock | |
| 4,993,803 A * | 2/1991 | Suverison et al. | 385/88 |
| 6,071,015 A | 6/2000 | Erbse et al. | |
| 6,719,461 B2 * | 4/2004 | Cull | 385/71 |
| 7,490,996 B2 * | 2/2009 | Sommer | 385/75 |

FOREIGN PATENT DOCUMENTS

| | | |
|---|---|---|
| DE | P4009380.8 | 9/1991 |
| DE | 19733174.2 | 2/1999 |
| EP | 1170609 A2 | 1/2002 |
| WO | WO 00/62109 | 10/2000 |

OTHER PUBLICATIONS

International Preliminary Examination Report for PCT Patent Application No. PCT/EP2006/001832. Jul. 10, 2007.

* cited by examiner

OPTICAL CONNECTOR ASSEMBLY

DESCRIPTION

FIELD OF THE INVENTION

The invention relates to an optical connector assembly for connecting optical waveguides to electro-optical components, in general, and for establishing multimedia connections in motor vehicles, for example in accordance with the MOST® standard, in particular.

BACKGROUND OF THE INVENTION

Owing to the increasing complexity of applications in the sector of informative motor vehicle electronics, which can in the meantime be referred to as multimedial, novel concepts have become necessary for linking various devices in the network.

For example, it should at least be possible for the car radio, the mobile telephone and the navigation system to communicate with one another such that, for example, the reproduction of music by the car radio is switched to mute and the mobile wireless connection is operated via the radio loudspeaker if the user wishes to make a telephone call. However, it is clear that this is only a very simple application case and the multimedial linking of the vehicle electronics in the network is subject to barely any limitations in order to satisfy the demands of the customers.

In order to fulfill these complex requirements, in the meantime optical data transmission has become established for these connections in the automobile sector. In this regard, a novel standard entitled MOST® has been specially developed. The specifications of the MOST® standard are published, inter alia, as "MAMAC Specification" Rev 1.0, 11/2002, Version 1.0-00 at http://www.mostnet.de/downloads/Specifications/MAMACSpecification_1VO-00.pdf and at http://www.mostnet.de/downloads/Specifications/MOST %20Physical %20Layer %20Specification/010223 WgPhy Drawings.zip. Reference is made to the specifications on which the MOST® standard is based, and the contents of these specifications are made completely the subject matter of this disclosure, by reference.

A compact type of optical MOST® connector comprises electro-optical converters which are fixed to the rear side of the connector. These connectors contain, in the interior, coupling elements for the purpose of connecting the converters.

Until now, plastic fibers, for example made from polymethyl methacrylate (PMMA) or polycarbonate (PC), have often been used in conjunction with MOST® connectors. Although they have a number of advantages, the relatively low temperature resistance under some circumstances leads to difficulties. Under extreme conditions, which need to be taken into consideration, temperatures in the range up to 100° C. may occur in an automobile. In the event of such temperatures, an accelerated ageing process sets in, in particular of the polycarbonate, with the result that the properties are permanently impaired.

The use of other fibers in place of the plastic fibers is, however, usually refused, in particular since the diameter of such fibers is substantially smaller than that of the conventionally used plastic fibers. This is because, owing to this small fiber diameter, considerable difficulties result when coupling them to the existing FOTs.

In principle, special devices are known for coupling optical fibers to light element modules. For example, a coupling is described in the patent DE 100 15 867 C2 which attempts to reduce the degree to which the transmission is impaired. It is proposed to provide a coupling which has an optical waveguide, which tapers in the form of a cone and has a lens, which is formed at the end of the large diameter, and also has a circular flange-like guide. However, this coupling, as a specially manufactured individual piece, is extremely complex and therefore cost-intensive in terms of production. Furthermore, dust may collect in the region of the lens, which reduces the transmission quality. In addition, the coupling needs to be inserted with a predetermined orientation, which entails the risk of errors during assembly. Finally, the coupling is in any case not designed for the connection of a thin fiber to a relatively large light element module.

All in all, however, the known solutions are worthy of improvement. On the other hand, in this severely contested market, even what appear to be only slight qualitative and/or cost-related advantages are sufficient in order to gain a decisive advantage in the competition on the market.

SUMMARY OF THE INVENTION

The invention therefore has the object of providing an optical connector assembly which is suitable for using optical waveguides having a small diameter for existing electro-optical components.

A further object of the invention is to provide an optical connector assembly which has relatively little damping despite a difference in diameter between the optical waveguide and the optically active area of the electro-optical component.

Yet another object of the invention is to provide a simple, cost-effective optical connector assembly which can be produced in a simple and cost-effective manner and is not very susceptible to faults.

Yet another object of the invention is to provide an optical connector which avoids or at least reduces the disadvantages of known connectors.

The object of the invention is achieved in a surprisingly simple manner by the subject matter of claim 1. Advantageous developments of the invention are defined in the dependent claims.

According to the invention, a connector assembly is provided which is designed to connect an optical waveguide, in particular an optical fiber, to an electro-optical component. The connector assembly comprises a connector having a preferably dielectric connector housing, which has a front-side mating connector receptacle for the purpose of receiving a complementary mating connector. The mating connector holds the optical waveguide at its contact end in order to establish an optical connection for the purpose of transmitting optical signals between the optical waveguide and the electro-optical component when the mating connection is formed between the connector and the mating connector.

The electro-optical component is in particular in the form of a transmitter/receiver, a pair of which is a so-called fiberoptic transceiver (FOT) for the purpose of converting optical signals into electrical signals (receiver) and vice versa (transmitter). The electro-optical components are arranged and fixed directly on a rear side of the connector which is opposite the front side. This provides a particularly compact design, for which reason this type of connector is referred to as "compact connector" in the art. The electro-optical components preferably contain a photo-sensitive detector, for example in the form of a photodiode (receiver) or a laser diode (transmitter) and accordingly have an optically active area for the purpose of coupling optical signals in/out on their side facing the connector. The diameter of the optically active area is typically predetermined by the manufacturers of the FOTs and, under certain circumstances, cannot be influenced or can only be influenced to a limited extent.

The connector also has, in particular within the mating connector receptacle, a connection element having a front cylindrical sleeve. The optical waveguide of the mating connector is connected to the connection element in order to establish the optical connection between the optical waveguide and the associated electro-optical component.

Furthermore, the connector has a separate optical coupling element which, in the mated state, is arranged axially between the optical waveguide and the associated electro-optical component, to be precise the optically active area of said electro-optical component, with the result that, in the mated state, signal transmission from the optical waveguide to the electro-optical component by means of the coupling element, or vice versa, is made possible. In the mated state, the coupling element is optically connected in particular on the front side directly to the associated optical waveguide and/or on the rear side directly to the electro-optical component. However, this should not rule out the possibility of an air gap, for example in the range from 0 to 50 μm, being provided between the optical boundary surfaces, as is required, for example, in accordance with the MOST® standard. Accordingly, each electro-optical component has precisely one associated optical waveguide, and the parts are arranged in the axial sequence of optical waveguide, coupling element, electro-optical component.

According to the invention, the coupling element is in the form of a short, i.e. in particular approximately 1 mm to 100 mm, in particular 3 mm to 30 mm, preferably 8 mm±50% short, optical waveguide section and has a preferably at least 50% larger diameter than the optical waveguide in order to provide simple diameter matching between the thinner optical waveguide, in particular a glass fiber, and the optically active area with its larger diameter. In this case, the coupling element preferably has a cylindrical shape and is produced from an optical waveguiding material, for example transparent plastic or glass. The optical waveguide section is preferably disconnected in a simple manner, as a short stretch or length, from a conventional long optical fiber having an optical waveguiding core and cladding. Accordingly, the cladding extends over the entire length of the optical waveguide section.

The optical waveguide section is in this case preferably cut away from a silica fiber, with a polymer cladding, better known as a polymer clad silica fiber (PCS fiber), a plastic fiber, for example polymer/polymer, a fiber bundle or a graded index fiber and has, on both sides, planar, possibly polished contact faces. Owing to the shortness of the optical waveguide section, expensive plastics which are resistant to high temperatures can also be used which are excluded from use for the long optical waveguides for reasons of cost. Alternatively, a glass rod can also be used.

This surprisingly simple solution results in a plurality of advantages at the same time. Firstly, the connector can be produced in a simple and cost-effective manner. In particular, it is possible to dispense with complicated refractive elements which are formed at the end face such as (focusing) lenses for the coupling element, and the coupling element can easily be inserted into the connector housing from the rear.

On the other hand, the inventors have found that, owing to the connector assembly providing a simple diameter matching, it is nevertheless possible to reduce the insertion damping or loss when coupling the signals into the receiver to such an extent that the requirements which are placed, for example, on a MOST® connection in the automobile sector can be fulfilled. Under certain circumstances, the insertion damping can even be reduced further if the refractive indices and diameters of the optical waveguide and of the coupling element are matched to one another. This can be achieved, for example, by a corresponding selection of the refractive index of the coupling element, which may be different than that of the optical waveguide.

In a particularly advantageous manner, the diameter of the cylindrical optical waveguide section is between the diameter of the optical waveguide and the diameter of the optically active area, which in turn has a larger diameter than the optical waveguide. This results in two-stage diameter matching or adaptation. In particular, the diameter of the optical waveguide section over its entire length is larger than that of the optical waveguide and/or smaller than that of the optically active area.

In accordance with one preferred embodiment, the diameter of the optical waveguide is approximately 50 μm to 600 μm, in particular 100 μm to 400 μm, preferably 200 μm±50%. It is known to those skilled in the art that an optical fiber comprises a core and a casing made from an optically conductive material having a relatively low refractive index, the so-called cladding. The fiber also preferably has an opaque protective casing (so-called jacket), which surrounds the optically conductive core and cladding.

The diameter of the optical waveguide section or of its optically conductive core with the cladding is preferably approximately 250 μm to 550 μm, in particular 300 μm to 500 μm, preferably 400 μm±20% or ±10%.

One significant advantage of the present invention is the fact that it makes it possible, in a simple manner, to use a thin glass fiber in conjunction with the MOST® connection system and nevertheless to keep insertion damping within an acceptable range. Precisely in the automobile sector, where very stringent requirements are placed on the thermal resistance, this is highly advantageous in comparison with the generally used plastic fibers (plastic optical fibers, POFs). In particular, the life of the assembly is thus increased and the transmission quality is improved. Silica fibers, in particular plastic cladded fibers, to be more precise PCS fibers, which are in principle known to those skilled in the art, have proven to be particularly suitable here.

In accordance with one advantageous embodiment of the invention, the connection element, which may be designed to be integral with or separate from the connector housing, has a rear body or trunk section, in which a cylindrical channel or a drilled hole is provided for the purpose of receiving the optical waveguide section. This receiving channel for the optical waveguide section extends from a rear optical contact face, which adjoins the electro-optical component, to a front optical contact face and opens out axially at a rear end of the sleeve of the connection element. The optical waveguide section is inserted into the channel and fixed, if appropriate, for example clamped or adhesively bonded. In a particularly advantageous manner, the optical waveguide section is thus fixed directly in the connector housing, to be more precise in the channel. However, it may also be connected directly to the electro-optical component, for example adhesively bonded into a receiving sleeve of the electro-optical component. The coupling element thus provides, at the front end of the channel, an optical connection face, which is free in the unmated state, for the purpose of making optical contact with the optical waveguide, in order to fulfill its coupling or transmission function.

The contact end of the optical waveguide is terminated by a collar, a so-called ferrule, which can be inserted axially, such that it fits precisely, into the front sleeve section of the connection element. The sleeve section has an inner rear stop face for the ferrule in order to ensure dimensional stability in the gap between the contact face of the optical waveguide and the front contact face of the coupling element.

The optical (glass) fiber, whose core and cladding form the optical waveguide, preferably has, at its contact end, a connection region, in which the protective jacket has been removed, in order to make precise radial positioning possible. Guidance is provided, for example, by the fact that the core including the cladding is held, in this connection region in which the jacket has been removed, directly by a terminating centering section of the ferrule. For example, the ferrule is fixed, in particular directly adhesively bonded, around the protective jacket of the fiber and, in the connection region, directly on the optical waveguide or, to be more precise, the cladding.

The channel for the coupling element preferably has a centering bush, which opens out in particular axially into the sleeve section and is designed to be complementary with respect to the centering section of the ferrule, the diameter of the centering sections being between the diameters of the optical waveguide and of the ferrule. The centering section and the centering bush accordingly form complementary centering means between the ferrule and the connection element. In the mated state, an end face of the centering section of the ferrule comes to bear against a rear stop face of the centering bush of the channel, which results in a defined gap (in the case of MOST 0 to 50 μm) between the optical waveguide and the coupling element. This embodiment provides longitudinal relative positioning, which is simple to produce but is precise, and at the same time precise radial guidance.

The channel is preferably subdivided at least into mutually adjoining front and rear sections, the inner diameter of the front section being matched to the diameter of the optical waveguide section in order to fix said optical waveguide section.

The mating connector receptacle of the female connector or connector housing is preferably formed by a cavity which is open at the front side, with the result that the male mating connector can be inserted into the receptacle. In this case, the connection element protrudes into the cavity from a rear side which delimits the cavity at the rear, in order to receive the optical waveguide with the associated ferrule of the mating connector.

In accordance with one particularly preferred embodiment of the invention, the connector is in the form of a compact connector in accordance with the MOST® standard, with the result that two electro-optical components are fixed next to one another in a side-by-side relationship on the rear side of the connector. In this case, one component is in the form of a transmitter and a further component is in the form of a receiver.

It is clear to those skilled in the art that the features of the reception path, if no differences are explained below, also correspondingly apply to the transmission path. In particular, it is necessary to take into account, in this regard, the fact that the optically active area of the transmitter, typically a laser diode, is smaller than the optically active area of the receiver. It has therefore proven to be advantageous to select the diameters of the two coupling elements or optical waveguide sections to be different. In particular, the diameter of the optical waveguide section in the transmission path is smaller than that in the reception path.

The invention will be explained in more detail below using an exemplary embodiment and with reference to the drawings, in which identical and similar elements are sometimes provided with the same references.

DETAILED DESCRIPTION OF THE INVENTION

Figure 1:
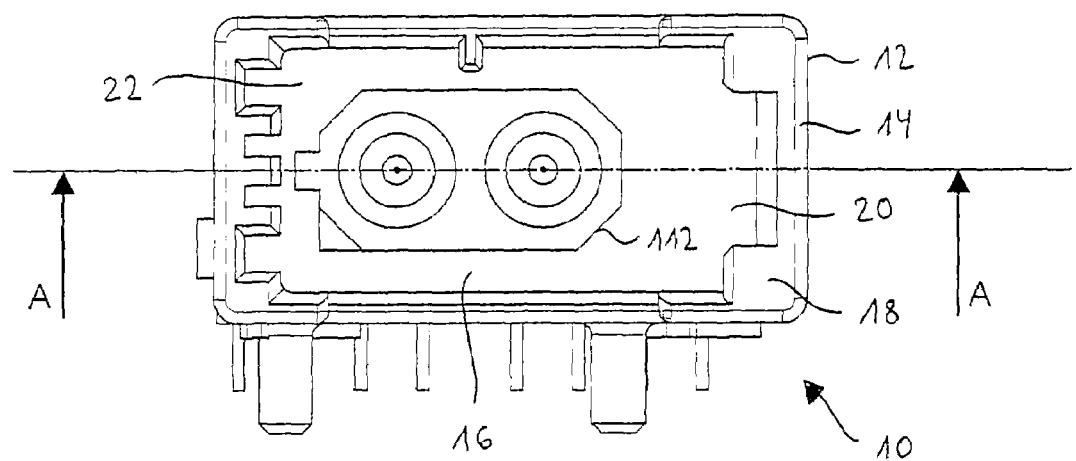
FIG. 1 shows a front view of the connector assembly according to the invention.

With reference to FIG. 1, the connector assembly 10 has a female MOST® connector 12 having a dielectric connector housing 14. The connector housing 14 has a mating connector receptacle 16, which comprises, on a front side 18 of the connector, an opening 20 for the purpose of inserting the mating connector 112 into the mating connector receptacle 16. The mating connector receptacle 16, which is accordingly defined as a cavity in the connector housing 14, is delimited at the rear side of the cavity by a rear wall 22 which is formed integrally with the connector housing.

Figure 2:
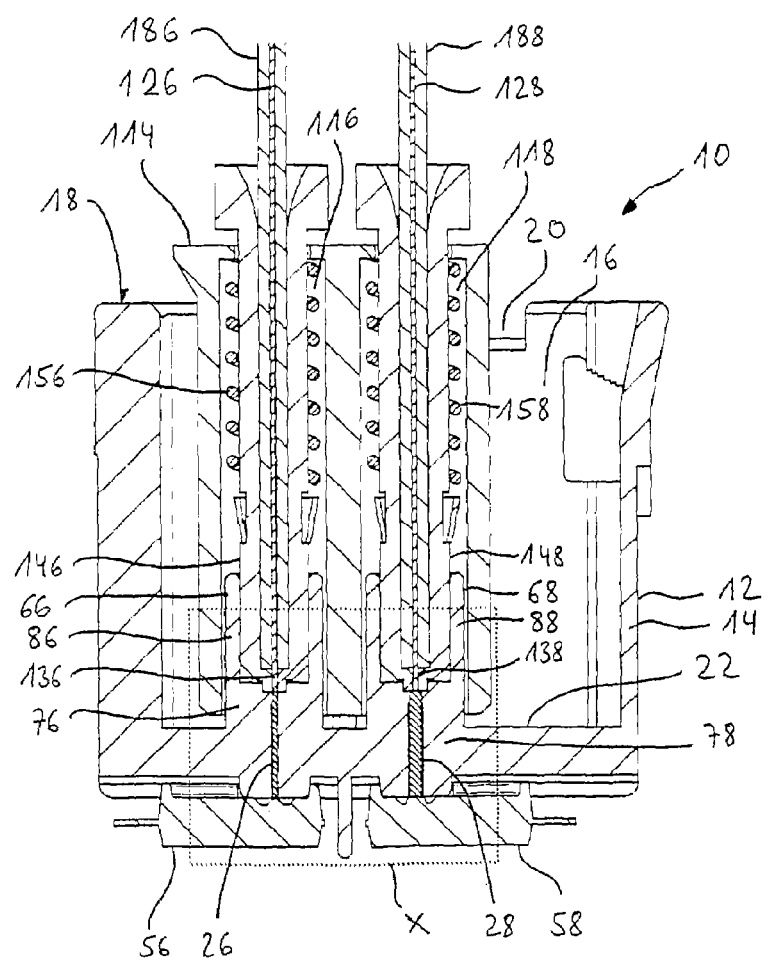
FIG. 2 shows a horizontal cross section through the connector assembly shown in FIG. 1, along the section line A-A.

With reference to FIG. 2, the mating connector 112 has a dielectric mating connector housing 114 which is designed for the purpose of forming the mating connection with the connector housing 14. The mating connector housing 114 has two channels 116, 118, in which optical waveguides in the form of optical fibers 126, 128 having protective jackets 186, 188 extend. Contact ends 136, 138 of the optical fibers 126, 128 are surrounded and held by ferrules 146, 148. To be precise, the optical fibers 126, 128 are adhesively bonded into the ferrules 146, 148. The ferrules 146, 148 are prestressed in their forward direction against the mating connector housing 114 by means of springs 156, 158.

Coupling elements 26, 28 are connected directly adjacent to the contact ends 136, 138 of the optical fibers 126, 128.

Figure 3:
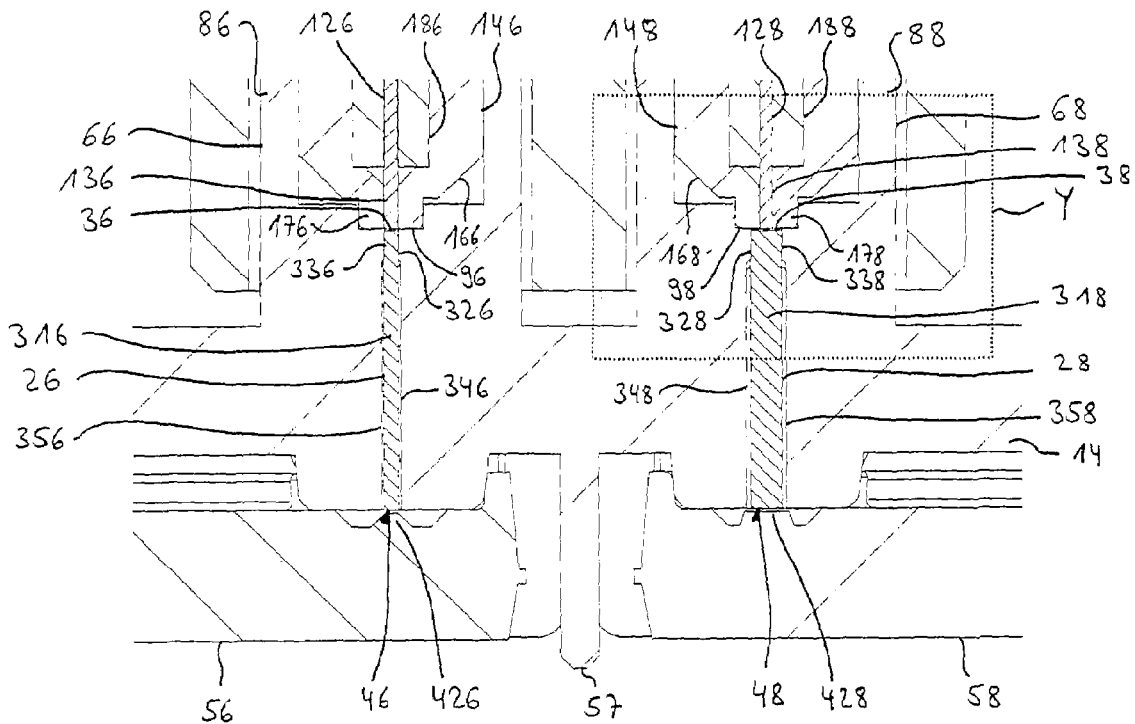
FIG. 3 shows the detail X from FIG. 2.

With reference to FIG. 3, the coupling elements 26, 28 are connected with their respective front optical connection face 36, 38 to the contact ends 136, 138 and with their respective rear optical connection face 46, 48 to electro-optical components 56, 58, to be precise for the purpose of establishing a connection for transmitting optical signals such that the coupling elements 26, 28 transmit optical signals between the optical fibers 126, 128 and the electro-optical components 56, 58 in the form of electro-optical converters forming a FOT.

The left-hand electro-optical converter 56 in FIG. 3 is, with a laser diode, in the form of a transmitter, and the right-hand electro-optical converter 58 is, with a photodiode, in the form of a receiver for optical signals. The two electro-optical converters 56, 58 are separated from one another by a partition wall 57 and are fixed to the rear side of the connector housing 14 by means of a metal clamp (not illustrated).

The ferrules 146, 148 are provided with bevels 166, 168 at their contact ends in order to make it easier for them to be inserted and terminate in cylindrical centering sections 176, 178.

Again with reference to FIG. 2, optical connection elements 66, 68 protrude into the mating connector receptacle 16 from the rear wall 22. The optical connection elements 66, 68 have rear trunk sections 76, 78 and front sleeve section 86, 88, into which in each case the ferrules 146, 148 are inserted.

Figure 4:
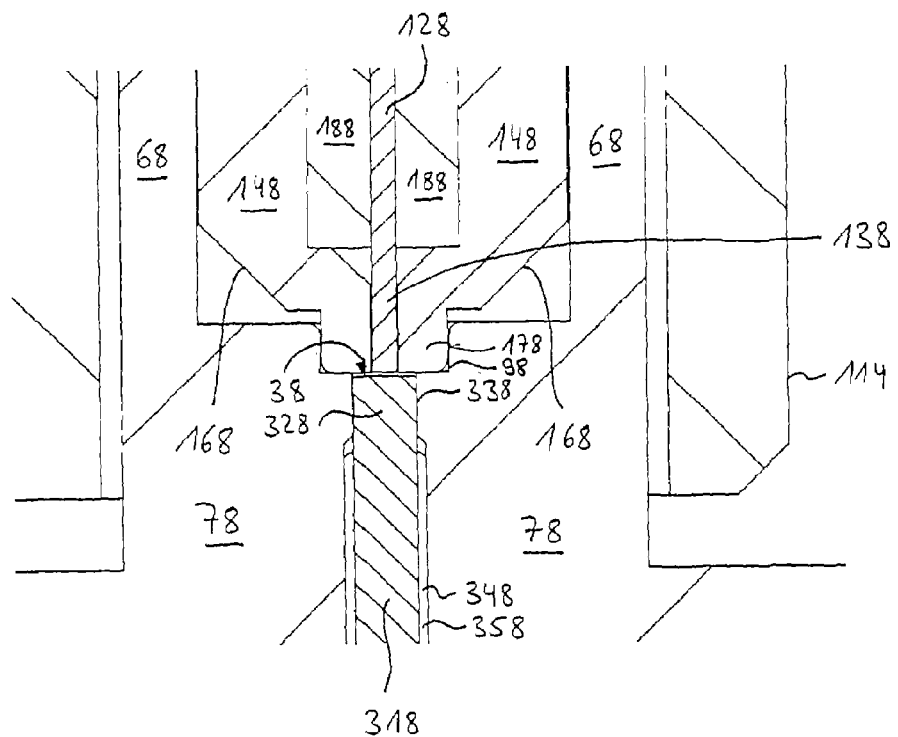
FIG. 4 shows the detail Y from FIG. 3.
Figure 5:
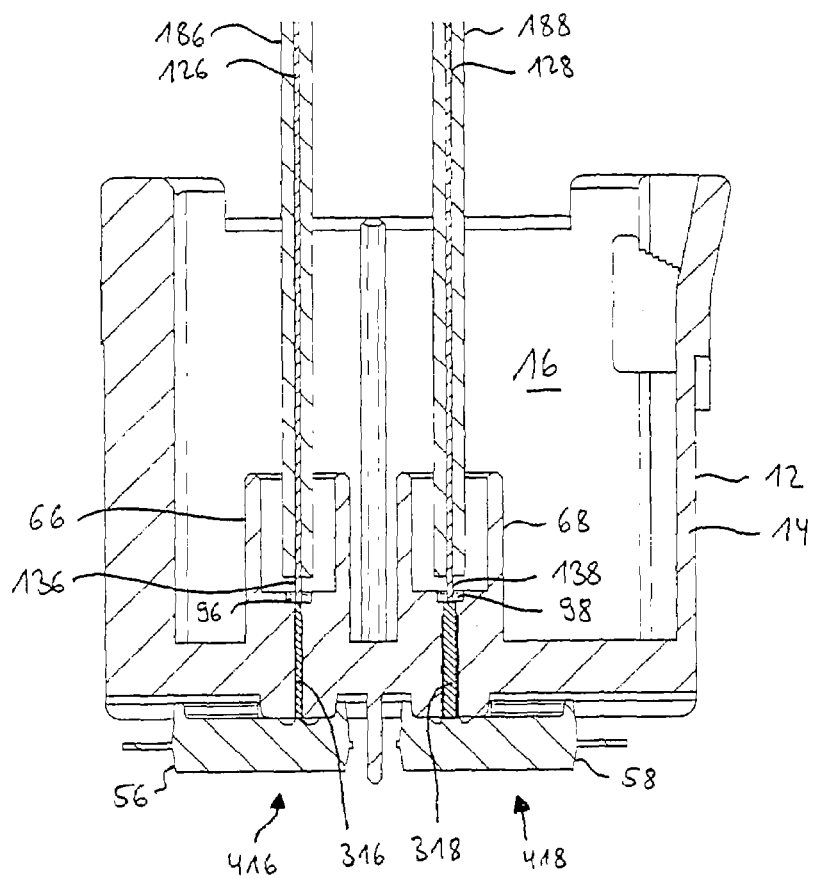
FIG. 5 shows the cross section from FIG. 2, but with the mating connector and the ferrules of the optical waveguide omitted.
Figure 6:
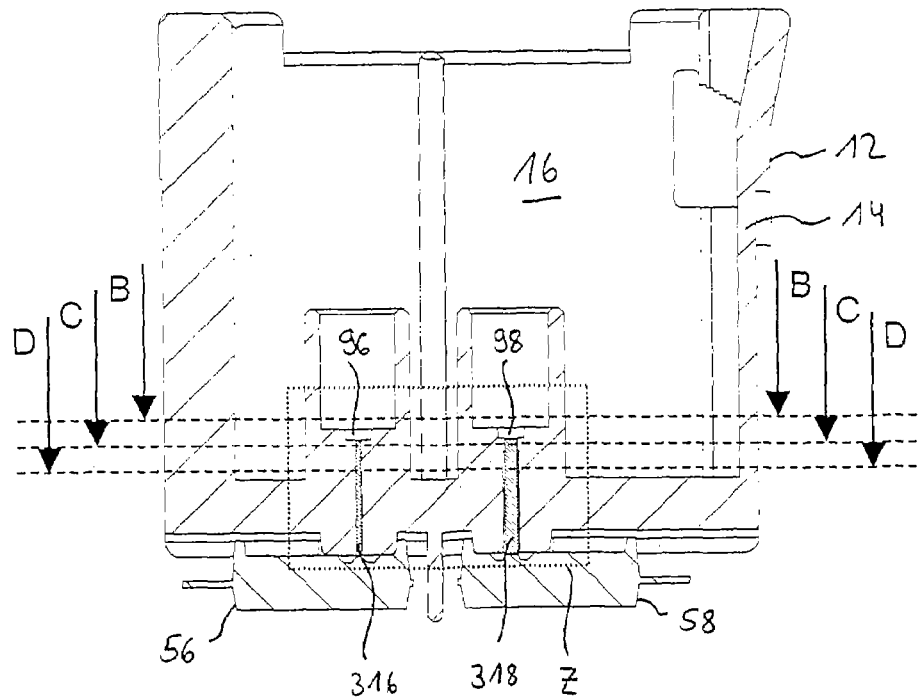
FIG. 6 shows a cross section through the connector according to the invention corresponding to FIG. 2.

With reference to FIGS. 3 and 4, in the mated state, the cylindrical centering sections 176, 178 of the ferrules center the optical fibers 126, 128 with respect to the optical connection elements 66, 68 by means of mating interaction with complementary cylindrical centering bushes 96, 98 and are prestressed against another with their respective end faces in order to ensure relative axial positioning between the optical waveguides and the coupling elements. In addition, the optical fibers 126, 128 protrude with their contact end 136, 138, from which the jacket has been removed, into the cylindrical centering bushes 96, 98 in order to establish an optical connection with the coupling elements 26, 28, which are in the form of optical waveguide sections 316, 318.

The optical waveguide sections 316, 318 are in the form of short sections of optical fibers and are fixed in a front region 326, 328 precisely in centering channels 336, 338, which open out into the centering bushes 96, 98, in this example to a length of approximately 0.5 to 1 mm.

Accordingly, the connection elements 66, 68 have channels 346, 348 which extend from the sleeve sections 86, 88 up to the electro-optical converters 56, 58 and in each case comprise at least three sections formed with different diameters, namely a rear section 356, 358 (facing the electro-optical converters 56, 58) for the purpose of receiving the coupling elements 26, 28, the central centering channel 336, 338 for the purpose of guiding the front region 326, 328 of the optical waveguide sections 316, 318 and, in a front section (facing the mating connector 112), the cylindrical centering bushes 96, 98 for the purpose of receiving the centering sections 176, 178 of the ferrules 146, 148. The optical waveguide sections 316, 318 are inserted into the respectively associated channel 346 or 348 from the rear, the central section for the respective optical waveguide section 316, 318 being in the form of a press fit, and the optical waveguide sections 316, 318 being fixed in the respective channel 346, 348 by means of these press fits.

Figure 7:
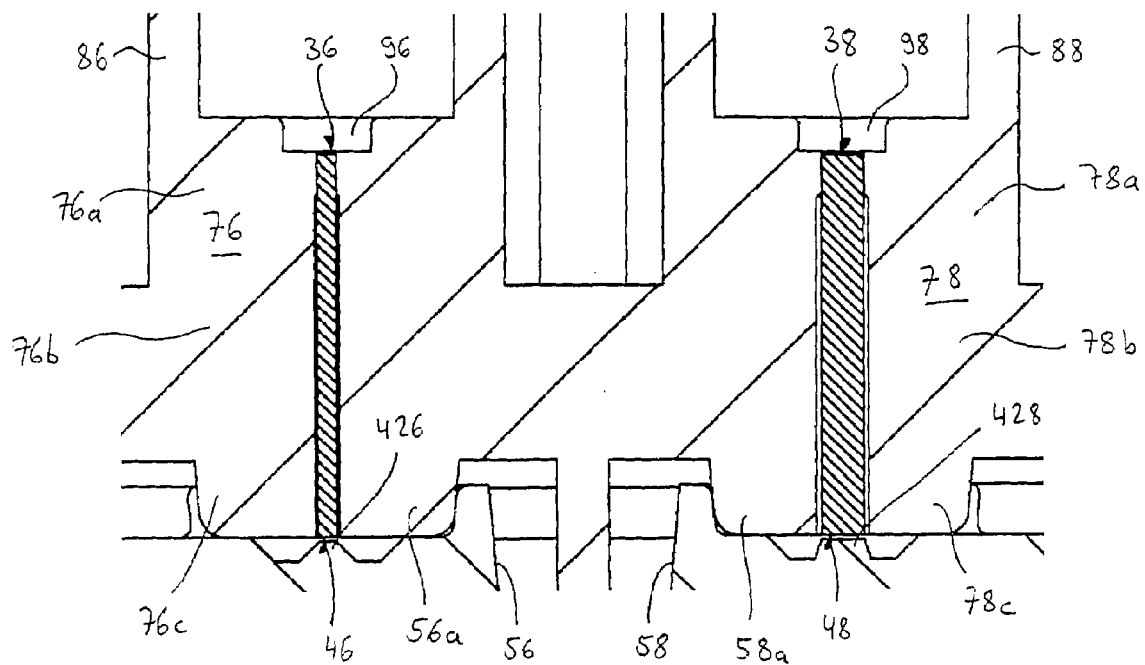
FIG. 7 shows the detail Z from FIG. 6.

As can be best seen in FIG. 7, the first and second trunk sections 76, 78 each have a front portion 76a, 78a, intermediate portion 76b, 78b and rear portion 76c, 78c, wherein the front portions 76a, 78a project into the receptacle 16 and the rear portions 76c, 78c project from the rear wall 22 into a recess 56a, 58a of the corresponding electro-optical converter 56, 58. The channels 346, 348 extend through the front portions 76a, 78a, intermediate portions 76b, 78b and rear portions 76c, 78c.

Figure 8:
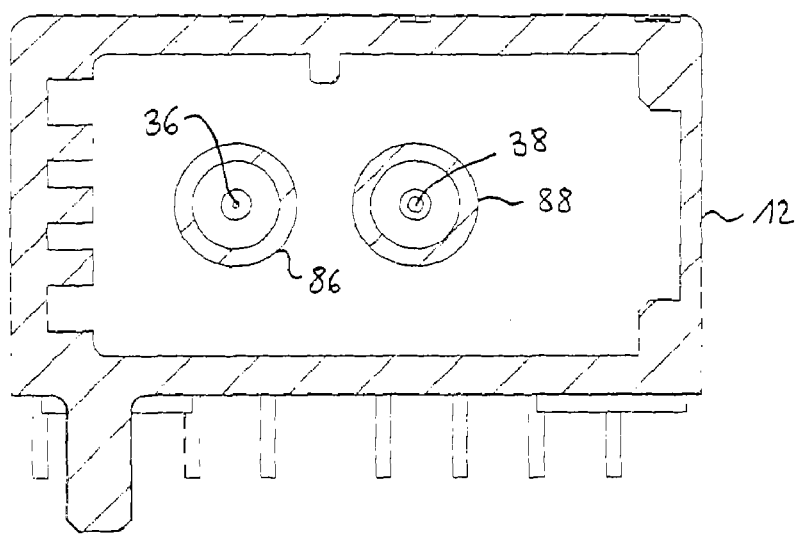
FIG. 8 shows a vertical cross section through the connector shown in FIG. 6, along the section line B-B.
Figure 9:
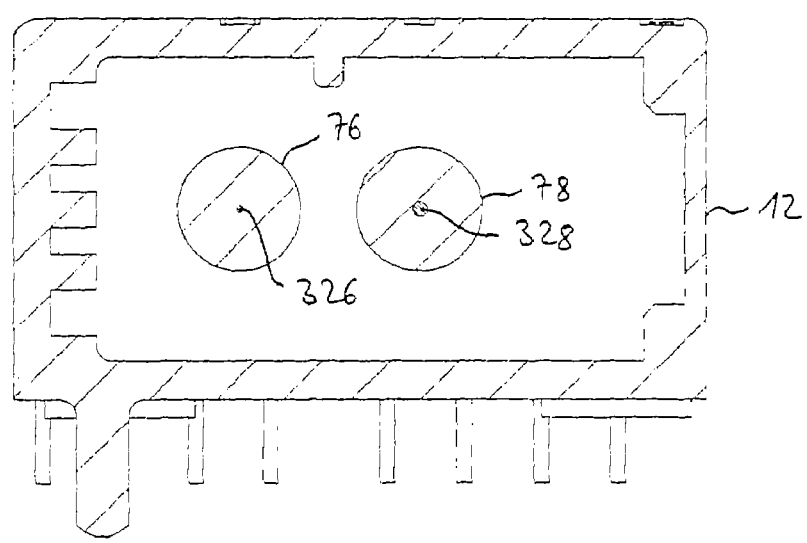
FIG. 9 shows a vertical cross section through the connector shown in FIG. 6, along the section line C-C.
Figure 10:
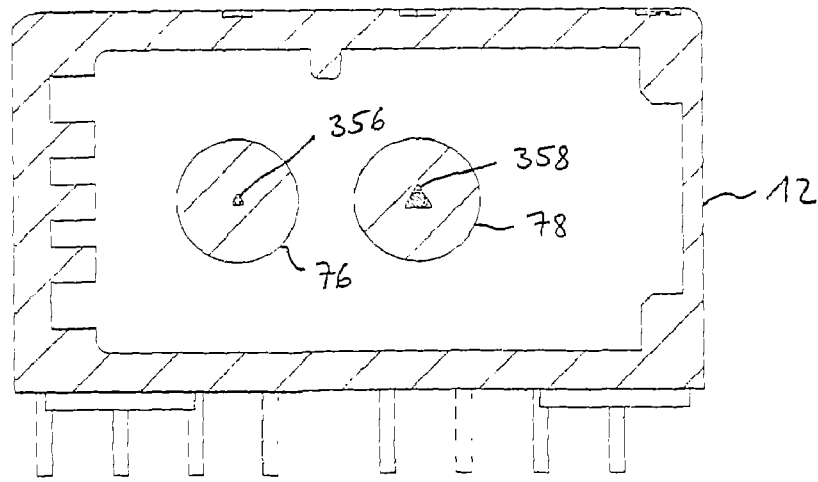
FIG. 10 shows a vertical cross section through the connector shown in FIG. 6, along the section line D-D.

With reference to FIGS. 8 to 10, the rear sections 356, 358 have a slightly larger diameter than the respective optical waveguide sections 316, 318 and have a non-circular, in this example essentially triangular, cross section in order to make it easier to insert the coupling elements 26, 28 and in order to compensate for manufacturing tolerances more effectively.

Figure 11:
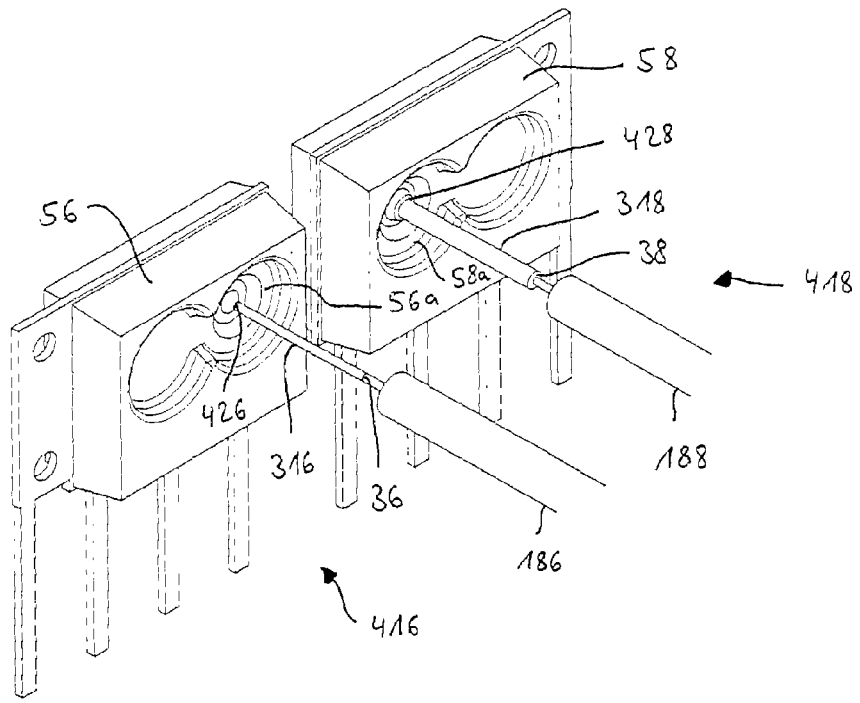
FIG. 11 shows a plan view, at an angle from the front, of the FOTs, coupling elements and optical waveguides.

As can best be seen in FIG. 11, the optical waveguide sections 316, 318 are provided in the form of circular cylinders. It is clear to those skilled in the art that the optical waveguide sections 316, 318 in this example are each in the form of a short stretch or piece having a core and cladding (not illustrated separately in the figures), which short stretch has been cut away from a conventional optical fiber. The optical waveguide sections 316, 318 each have a front planar contact face 36, 38 and a rear planar contact face 46, 48 having a low surface roughness. The contact faces 36, 38, 46, 48 can in particular be polished, lapped or precision-separated.

It has proven to be particularly suitable for a PCS fiber to likewise be used for the optical waveguide sections 316, 318. However, pieces of a fiber having a glass core and glass cladding (silica/silica), of a plastic fiber or of a graded index fiber can also be used.

Furthermore, the diameter of the optical waveguide section 318 is larger than the diameter of the optical waveguide 128 and larger than that of the optical waveguide section 316. In this exemplary embodiment, the optical waveguide 128 is in the form of a core and cladding having a diameter of 200 µm of a polymer clad silica (PCS) fiber, whereas the optical waveguide section 318 has a diameter of approximately 400 µm.

This diameter matching by means of the optical waveguide section 318 in the reception path 418 is not absolutely necessary in the transmission path 416, but is not ruled out. In the example used here, the optical waveguide section 316 has a similar diameter to the optical waveguide 126 or the PCS fiber. The different diameters of the optical waveguide sections 316, 318 in the transmission or reception path 416, 418 takes the different diameters of the optically active areas 426, 428 of the transmitter 56 and of the receiver 58, respectively, into account.

With reference to FIGS. 7 and 11, it is illustrated that the optically active area 426 of the transmitter 56 has approximately the same diameter as the optical waveguide section 316 and the optical waveguides 126, 128, in this case approximately 200 µm in each case. On the other hand, the optically active area 428 of the receiver 58 has a diameter of approximately 600 µm, with the result that the diameter of the optical waveguide section 318, which is 400 µm, is approximately in the center between the diameter of the optical waveguide 128 and of the optically active area 428.

The two optical waveguide sections 316, 318 have the same length of approximately 7 to 8 mm, but it is clear to those skilled in the art that this length can be varied within certain limits depending on which electro-optical converters are used and on the design of the connector housing 14.

It is clear to those skilled in the art that the above-described embodiments are to be understood as examples, and that the invention is not restricted to these embodiments but can be varied in diverse ways without departing from the essence of the invention.

The invention claimed is:

1. An optical connector assembly (10), comprising:
a connector (12), the connector (12) including a connector housing (14), the connector housing (14) including a mating connector receptacle (16) formed by a cavity, the cavity being open on a front side (20) of the connector (12), the connector (12) further including first and second connection elements (66, 68) protruding into the cavity from a rear side (22) of the connector (12);
a mating connector (112) to mate with the connector (12); and
first and second optical fibers (126, 128), each optical fiber (126, 128) being held by the mating connector (112) at a contact end (136,138) thereof, each optical fiber (126, 128) used to establish an optical connection, when the connector (12) is mated with the mating connector (112), between the first optical fiber (126) and a first electro-optical converter (56) and between the second optical fiber (128) and a second electro-optical converter (58), the first and second electro-optical converters (56, 58) being arranged side-by-side on the rear side (22) of the connector (12), the second electro-optical converter (58) including an optically active area (428) for coupling optical signals in;

wherein a first optical coupling element (26) is arranged in the connector (12) between the first optical fiber (126) and the first electro-optical converter (56) for passing light waves from the first electro-optical converter (56) through the first optical coupling element (26) into the first optical fiber (126);

wherein a second optical coupling element (28) is arranged within the connector (12) between the second optical fiber (128) and the second electro-optical converter (58) for passing light waves from the second optical fiber (128) through the second optical coupling element (28) into the second electro-optical converter (58), the second coupling element (28) comprising a substantially cylindrical optical waveguide section (318); and wherein the optically active area (428) of the second electro-optical converter (58) has a larger diameter than the second optical fiber (128), and the second optical waveguide section (318) has a larger diameter than the second optical fiber (128).

2. The connector assembly (10) of claim 1, wherein the first electro-optical converter (56) is a transmitter and the second electro-optical converter (58) is a receiver.

3. The connector assembly (10) of claim 2, wherein each of the first and second connection elements (66, 68) are adapted to receive an associated one of the first and second optical fibers (126, 128).

4. The connector assembly (10) of claim 3, wherein the first electro-optical converter (56) includes an optically active area (426) for coupling optical signals out.

5. The connector assembly (10) of claim 4, the diameter of the second optical waveguide section (318) being between the diameter of the second optical fiber (128) and the diameter of the optically active area (428).

6. The connector assembly (10) of claim 5, the diameter of the second optical waveguide section (318) being between 250 μm and 550 μm.

7. The connector assembly (10) of claim 6, the diameter of the second optical waveguide section (318) being 400 μm +20%.

8. The connector assembly (10) of claim 4, the optical waveguide section (316, 318) having, on both sides, essentially planar contact faces (36, 38, 46, 48) for connecting the optical fibers (126, 128) and the electro-optical converters (56, 58).

9. The connector assembly (10) of claim 4, the second optical waveguide section (318) comprising a short stretch which is cut from a predetermined length of an optical fiber.

10. The connector assembly (10) of claim 9, the second optical waveguide section (318) comprising a section of a polymer clad silica fiber.

11. The connector assembly (10) of claim 9, the second optical waveguide section (318) comprising a section of a plastic fiber.

12. The connector assembly (10) of claim 9, the second optical waveguide section (318) comprising a section of a fiber bundle.

13. The connector assembly (10) of claim 9, the second optical waveguide section (318) comprising a section of a graded index fiber.

14. The connector assembly (10) of claim 9, the second optical waveguide section (318) comprising a glass rod.

15. The connector assembly (10) of claim 5, the diameter of the glass fibers (126,128) being in the range between 50 μm and 600 μm.

16. The connector assembly (10) of claim 4, the first and second glass fiber (126, 128) comprising a first and second polymer clad silica fiber, respectively.

17. The connector assembly (10) of claim 4, the first and second channel (346, 348) each being subdivided at least into a front and a rear section (356, 358), the inner diameter of the front section (336, 338) being matched to the diameter of the associated optical waveguide section (316, 318) such that the front section (336, 338) of the first and second channel (346, 348) forms a fit for the first and second optical waveguide section (316, 318), respectively.

18. The connector assembly (10) of claim 17, the inner diameter of the rear section (356, 358) of the first and second channel (346, 348) being larger than that of the associated front section (336, 338), and the rear sections (356, 358) having an essentially triangular cross section.

19. The connector assembly (10) of claim 18, the first optical waveguide section (316) and the second optical waveguide section (318) having different diameters.

20. The connector assembly (10) of claim 4, wherein the first and second connection elements (66, 68) have first and second rear trunk sections (76, 78) being integrally formed with the connector housing (14) and defining first and second channels (346, 348) accommodating the first and second coupling elements (26, 28), respectively.

21. The connector assembly (10) of claim 20, wherein the first and second rear trunk sections (76, 78) are integrally formed with a rear wall (22) of the connector housing (14).

22. The connector assembly (10) of claim 21, the first and second trunk sections (76, 78) each having a rear portion (76c, 78c) projecting into a recess (56a, 58a) of the corresponding electro-optical converter (56, 58).

* * * * *